United States Patent [19]

Eilertsen

[11] Patent Number: 4,578,604

[45] Date of Patent: Mar. 25, 1986

[54] SOLENOID ACTUATORS

[75] Inventor: John L. Eilertsen, Birmingham, Mich.

[73] Assignee: Dante Giardini, Dearborn Heights, Mich. ; a part interest

[21] Appl. No.: 590,040

[22] Filed: Mar. 15, 1984

Related U.S. Application Data

[63] Continuation-in-part of Ser. No. 323,239, Nov. 20, 1981.

[51] Int. Cl.[4] .............................................. H02K 33/00

[52] U.S. Cl. ........................................ 310/30; 310/24; 310/35

[58] Field of Search ........................ 310/19, 30, 39, 35, 310/23, 24, 16, 15

[56] References Cited

U.S. PATENT DOCUMENTS

| | | | |
|---|---|---|---|
| 2,898,532 | 8/1959 | Wintermute | 310/35 X |
| 3,119,940 | 1/1964 | Pettit et al. | 310/24 |
| 3,312,842 | 4/1967 | Heuchling et al. | 310/30 X |
| 3,484,629 | 12/1969 | Kunz | 310/35 X |

*Primary Examiner*—Donovan F. Duggan
*Attorney, Agent, or Firm*—Barnes, Kisselle, Raisch, Choate, Whittemore & Hulbert

[57] ABSTRACT

Solenoid actuators which include a stator assembly comprising a plurality of spaced parallel poles having coplanar end faces and symmetrically spaced side faces. An armature is mounted for attraction to and motion with respect to said stator, at least a component of which is perpendicular to the coplanar stator pole end faces and parallel to the pole side faces. The armature comprises a generally flat plate having a surface in parallel opposition to the pole end faces, and a plurality of integral ribs which extend between adjacent pairs of stator poles and have side faces opposed to and parallel to the pole side faces. Thus, the air gap between the stator and armature has a variable dimension component between the pole end faces and the opposing armature, and a fixed dimension component between the rib and pole side faces. The resulting output power versus stroke characteristic exhibits high output power at the beginning of the stroke, followed by a substantially constant power versus stroke function.

8 Claims, 6 Drawing Figures

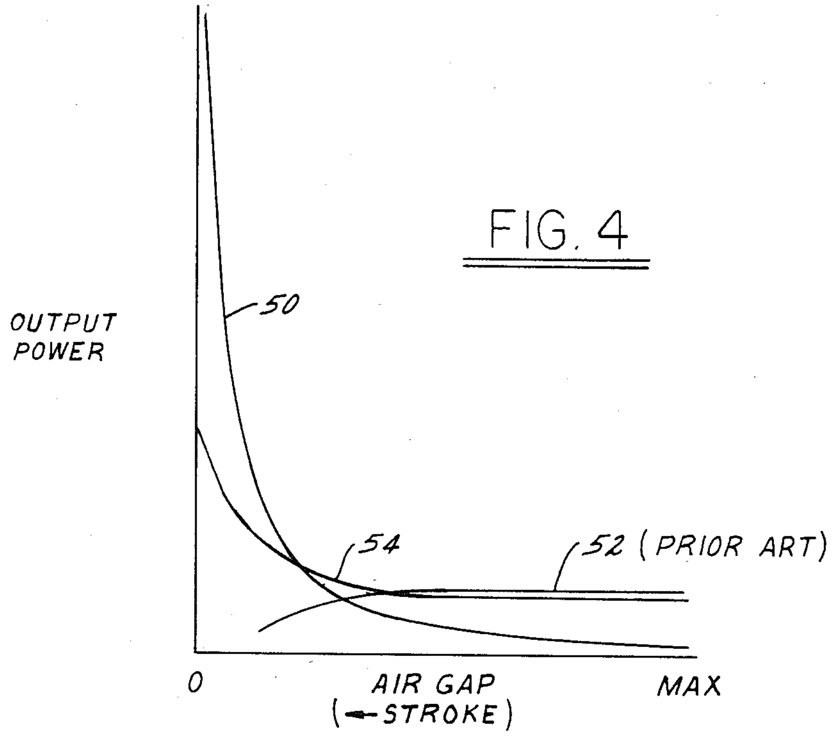
FIG. 4
FIG. 5
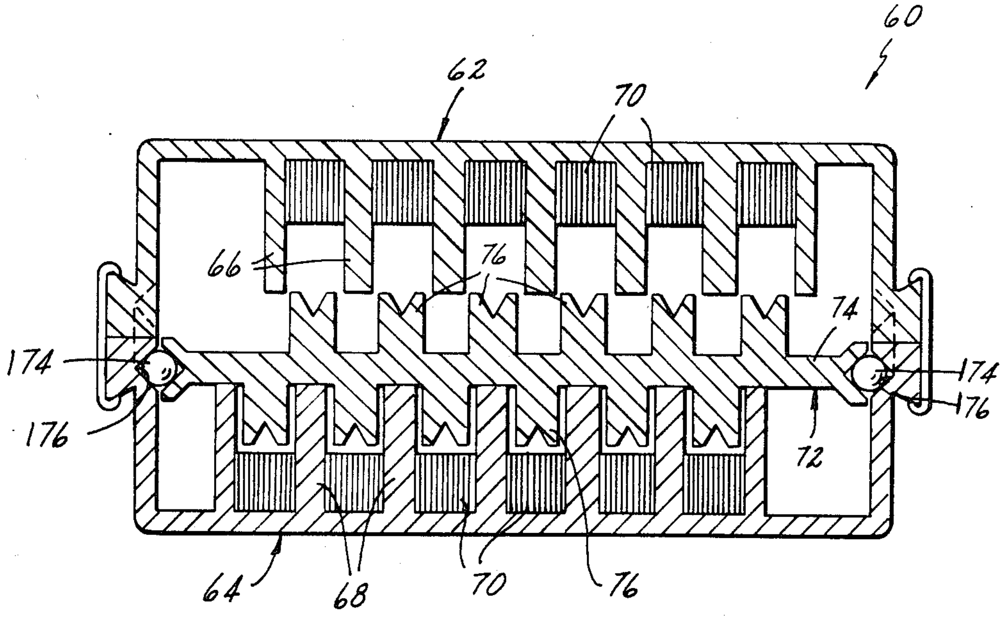

SOLENOID ACTUATORS

This application is a continuation-in-part of application Ser. No. 323,239 filed Nov. 20, 1981. Reference also is made to the copending application of the inventor herein, Ser. No 589,727 filed concurrently herewith, which application is also a continuation-in-part of the parent to the present application. The disclosures of said parent and copending applications are incorporated herein by reference.

The present invention is directed to electromagnetic solenoid actuators, and more particularly to improvements in actuators having either fixed or variable axis.

In general, solenoid actuators which are characteristic of the prior art possess either fixed or variable air gaps between the associated stator and armature structures. For example, the above-noted parent and copending applications of the inventor herein disclose a number of fixed and variable axis actuators in which air gap, i.e. the distance between the associated armature and stator structures, varies with armature stroke. The solenoid actuators so disclosed are very efficient in terms of output force versus actuator weight and/or versus input power. However, the characteristic or function of actuator output force versus stroke distance is not as constant as desired in these and other variable air gap actuators.

U.S. Pat. No. 4,097,833 discloses a number of solenoid actuators in which the air gap between the armature and stator poles remains constant with armature stroke due to the fact that the opposing stator and armature faces are parallel to the stroke direction. However, the solenoid actuators so disclosed are not as efficient as desired, and the force versus stroke characteristic thereof undesirably decreases at the end of the armature stroke.

It is therefore an object of the present invention to provide improvements in construction of solenoid actuators which achieve improved efficiency in terms of reduced size and cost for a given output power or stroke requirement as compared with actuators characteristic of the prior art.

Another and more specific object of the invention is to provide solenoid actuators which exhibit high output power at the ends of the armature stroke as is typically desirable for efficient operation of external devices, and which exhibits a substantially constant power versus stroke characteristic for the remainder of the stroke.

The invention, together with additional objects, features and advantages thereof, will be best understood from the following description, the appended claims and the accompanying drawings in which:

FIG. 4 is a graphic illustration of the output power versus stroke characteristic of the actuator illustrated in FIGS. 1–3;

FIG. 5 is a sectioned elevational view of an alternative embodiment of the invention.

In general, the foregoing and other objects of the invention are obtained by providing solenoid actuators in which the air gap between the armature and stator has both fixed and variable dimension components. That is, the air gap in the solenoid actuators of the present invention possess one dimensional component parallel to stroke direction wherein the distance between opposed stator and armature faces varies with armature stroke while the "overlap" or areas of armature and stator face-to-face opposition perpendicular to such first dimensional component remain substantially constant. The air gap of the actuators of the present invention further possess a second dimensional component perpendicular to stroke direction wherein the air gap distance between opposed stator and armature faces remains constant while the area of overlap between the opposed faces varies with stroke. As a result, the solenoid actuators of the present invention obtain the desired high output power at the beginning and for most of the stroke distance, which is characteristic of variable air gap actuators, and a substantially constant power versus stroke characteristic for the intermediate portion or remainder of the stroke as is characteristic of fixed air gap actuators.

Figure 2:
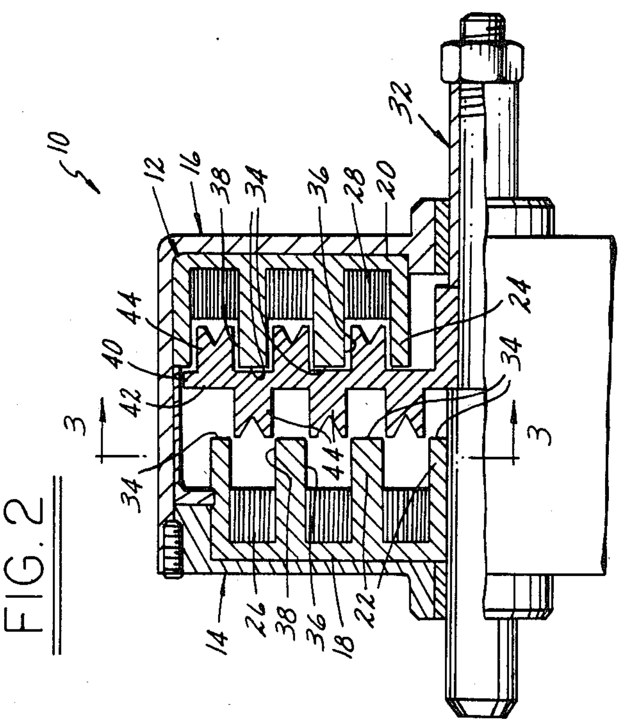
FIG. 2 is a fragmentary partially sectioned side elevational view of the actuator of FIG. 1.
Figure 3:
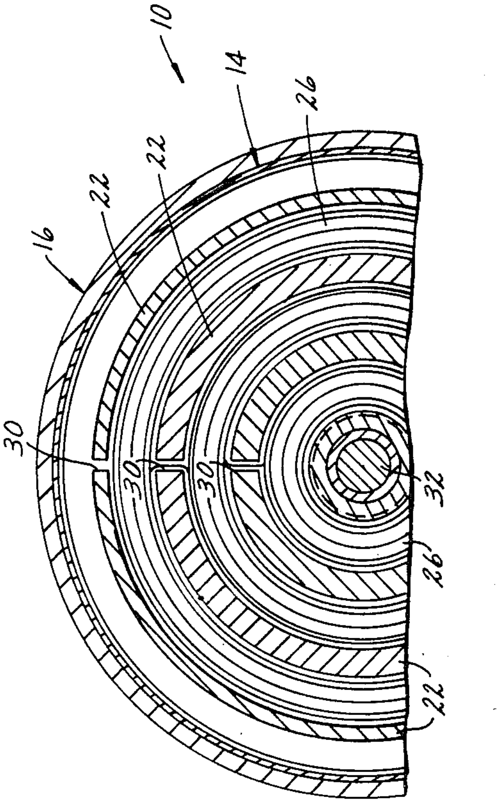
FIG. 3 is a fragmentary sectional view taken substantially along the line 3—3 in FIG. 2.
Figure 1:
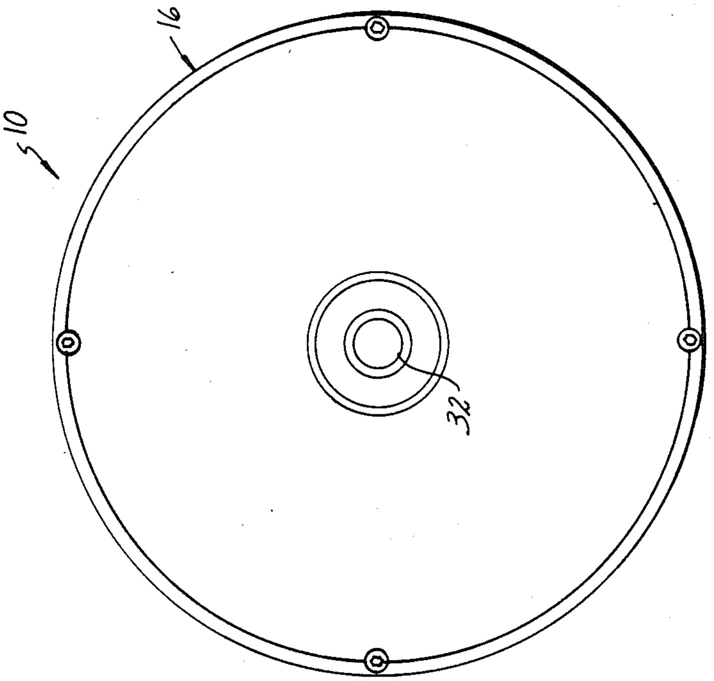
FIG. 1 is an end elevational view of one embodiment of a solenoid actuator in accordance with the invention.

FIGS. 1–3 illustrate a presently preferred embodiment 10 of a fixed axis solenoid actuator in accordance with the present invention as comprising a pair of opposed stator assemblies 12,14 mounted within a non-magnetic frame or housing 16. Each stator assembly 12,14 includes a stator of magnetic material having a flat circular base 18,20 from which a plurality of annular radially spaced axially extending poles 22,24 integrally project. It will be noted in particular with reference to FIG. 2 that the annular poles 22,24 of stator assemblies 12,14 are radially spaced and staggered so that each pole 22 of stator assembly 14 is positioned midway between an adjacent pair of poles 24 on the opposing stator assembly 12, and vice versa. Each pole 22,24 of stator assemblies 14,12 is rectangular in radial cross section (FIG. 2) and has a flat axially oriented end face 34 which is coplanar with the axially oriented end faces of the same stator assembly and in parallel axial opposition to the axially oriented end faces of the opposing stator assembly. The axial distance between faces 34 of opposing stator assemblies 12,14 is fixed and constant. Each pole 22,24 further has concentric cylindrical radially inwardly and outwardly facing exposed side faces 36,38 which are concentric with each other and with the side faces of the opposing stator assembly.

An electric coil 26,28 is mounted to each stator assembly 14,12 respectively. Most preferably, each coil 26,28 is formed from a continuous length of electrically conductive ribbon stock spirally wound on a mandrel or the like so as to extend in opposite directions between adjacent pole pairs on each stator assembly and extend in assembly through small gaps 30 (FIG. 3) in each annular pole 22 (and 24). Stator assemblies 12,14 are mounted within non-magnetic housing 16 which has a central opening in which the actuator output shaft 32 is slidably mounted. An armature 40 is affixed to output shaft 32 and is positioned between stator assemblies 12,14 within housing 16 so as to be alternately electromagnetically attracted thereto and thereby provide a fixed axis linear actuator output by means of slidable shaft 32. Armature 40 includes a generally flat armature body 42 in the form of a flat circular disc having parallel planar surfaces opposed to axially oriented pole end faces 34 of opposed stator assemblies 12,14. A plurality of radially spaced circumferentially continuous concentric annular ribs 44 integrally project in alternately opposite axial directions from the planar surfaces of armature disc body 42. Ribs 44 are spaced radially from each other so as to be disposed and received in assembly between adjacent pairs of poles 22 or 24. Ribs 44 which are generally rectangular in radial cross section (FIG. 2) have cylindrical side faces 46 which are concentric with each other and with the side faces 36,38 of the stator poles. The side faces 46 of ribs 44 are spaced radially from the opposing side faces 38 of poles 22,24. Preferably, such radial spacing is equal for all opposed faces 38,46. A V-shaped channel is formed in the axial end face of each armature rib 44.

In operation, when coil 26 of stator assembly 14 is energized, for example, armature 40 is attracted thereto in the left-hand direction as viewed in FIG. 2, and thus moves to the left with actuator output shaft 32. Armature ribs 44 increasingly radially overlap side faces 36,38 of poles 22 while the radial air gap distances therebetween remain constant. At the same time, the axial air gap distance between pole end faces 34 and the opposing flat surface of armature disc body 40 decreases with armature movement while the overlap area therebetween remains substantially constant. When coil 26 is de-energized and coil 28 of stator assembly 12 is energized, armature 40 is attracted to the latter, thus moving output shaft 32 in the right-hand direction in FIG. 2. Again, overlap area between side faces 38,46 varies with stroke while the radial air gap distance therebetween remains constant, and axial air gap distance between end faces 34 and armature body 42 varies with stroke while overlap remains constant. The end face channels on ribs 44 function to route magnetic lines of flux into the body of each rib.

FIG. 4 is a graphic illustration of the output power versus stroke characteristic of the embodiment of the invention illustrated in FIGS. 1–3. The output curve 50 is illustrative of solenoid actuators disclosed in the parent to the present application which has a flat armature disc body with no ribs 44 (FIG. 2) disposed between stator assemblies similar to 12,14 in FIG. 2. The armature/stator air gap dimension thus varies (along the abscissa) as a direct continuous function of axial stroke, while the opposing armature-stator overlap areas remain constant. It will be noted that the output power is high at the beginning of the stroke and remains at a substantially constant level until the very end of the stroke (zero air gap). The curve 52 illustrates output of the fixed air gap solenoid actuators disclosed in U.S. Pat. No. 4,097,833. Such actuators provide high output power at the beginning of the stroke and thereafter exhibit substantially constant power with stroke distance until the power falls off drastically off near the end of the stroke. The curve 54 illustrates the output obtained in accordance with the embodiment of the invention illustrated in FIGS. 1–3 which achieves relatively high output power at the end of the stroke, and otherwise exhibits a substantially constant output power versus stroke characteristic. The present invention, where the armature/stator air gap has both fixed and variable components, thus obtains the high initial output power at maximum air gap, while at the same time yielding a substantially constant power versus stroke characteristic for a major portion of the stroke, and then higher power at the end of the stroke (zero air gap).

It will be appreciated that the embodiment of FIGS. 1–3 may be employed as a variable position actuator as well as an on-off actuator as thus far described. That is, the position of armature 40 and output shaft 32 may be varied between extreme limits by controlling the energization current through the coils 26,28. Another modification to the embodiment of FIGS. 1–3 contemplates provision of a separate coil between a single pair of adjacent poles in each stator assembly, which coil may be connected in the manner of a linear voltage differential transformer which thus is responsive to position of armature 40 between the stator assemblies.

FIG. 5 illustrates a variable axis linear actuator 60 in accordance with the invention as comprising a pair of stator assemblies 62,64, each of which includes a plurality of laterally spaced longitudinally extending parallel poles 66,68. The poles 66 of stator assembly 62 are staggered with respect to the poles 68 of stator assembly 64 so that each pole of each stator assembly is positioned midway between an adjacent pair of poles in the opposing assembly. A plurality of electromagnetic coils 70 of generally oval construction are positioned over and encircle alternate poles in each pole array and are suitably connected to an external source of electric power (not shown). A generally flat rectangular armature 72 is mounted by the ball bearings 174 in angulated channels 176 formed along side edges of stator assembly 62,64 for movement both in the axial direction (into and out of the page) and in the direction of the respective stator assemblies (up and down in FIG. 5). To the extent thus far described, actuator 60 is similar to those disclosed in the aforementioned parent application.

In accordance with the present invention, armature 72 includes a plurality of laterally spaced longitudinally extending parallel ribs 76 integrally projecting from armature plate 74 in alternating opposite directions so as to be disposed between adjacent pairs of poles 66,68 in stator assemblies 62,64 respectively. Thus, the flat surfaces of armature body 74 oppose coplanar flat end faces of each pole 66,68, with the area of overlap therebetween remaining constant and with the air gap dimension therebetween varying with armature stroke. On the other hand, the parallel laterally facing side faces of ribs 76 variably overlap the opposing parallel side faces of poles 66,68, while the air gap dimension therebetween remains constant.

It will be appreciated in both FIGS. 2 and 5 that the width-wise or lateral dimension of the armature ribs is no greater than the lateral dimension of the space between oppositely projecting armature ribs. Likewise, the length of stator poles projecting from coils 26,28 and 70 is greater than the corresponding dimension of ribs 44 and 76 so that the rib end faces do not abut the stator coils.

Figure 6:
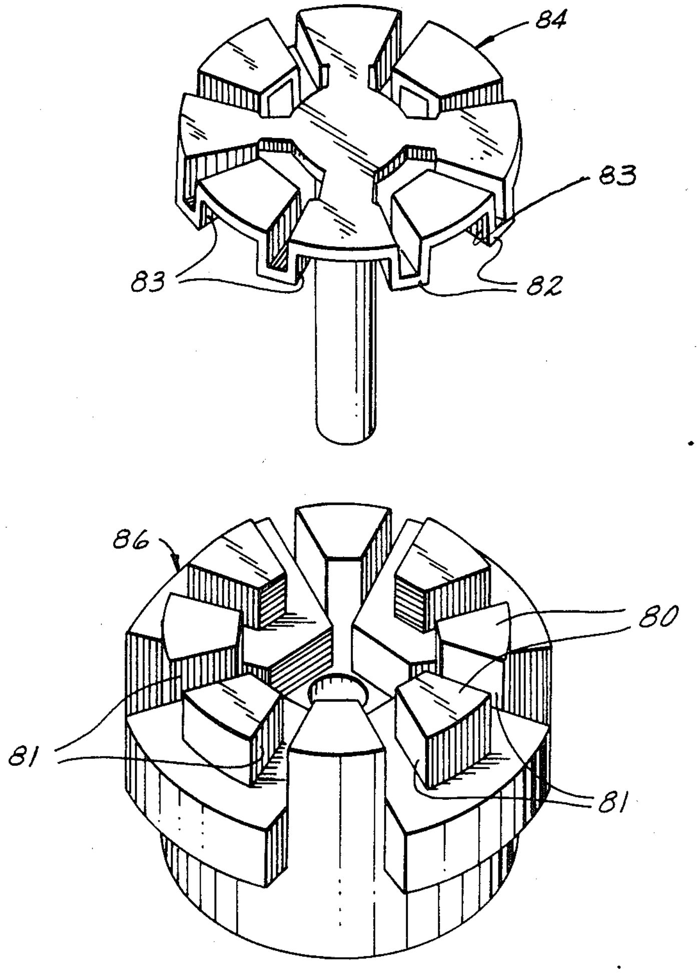
FIG. 6 is an exploded perspective view of another modified embodiment of the invention.

A modification to the embodiment of FIGS. 1–3, which is illustrated in FIG. 6, contemplates replacement of the annular stator poles and rotor ribs with circumferentially spaced radially extending poles 80 on stator 86 and ribs 82 on armature 84. In such a modification, the side faces 81,83 of the stator poles 80 and armature ribs 82 would be in planes parallel to the axial stroke direction of armature 84 and would face each other in the circumferential direction, which is perpendicular to stroke. Such circumferential spacing would remain constant, with the axial overlap varying with stroke. The axial air gap dimension would vary as in FIGS. 1–3.

It will be noted in the drawings, particularly FIG. 5, that the armature "shorts out" the magnetic circuit at the end of the stroke where the variable component of the air gap is at zero. This yields the increasing force characteristic in FIG. 4, as distinguished from the decreasing characteristic of the prior art illustrated at 52. The invention thus contemplates parallel (FIG. 5), concentric (FIGS. 1-3) and radial (FIG. 6) armature/stator pole structures.

The invention claimed is:

1. A solenoid actuator comprising a generally flat armature, means mounting said armature for movement through a defined stroke path having a path component perpendicular to said armature, and a stator mounted to said path-defining means and oriented with respect to said armature to be electromagnetically coupled to said armature for drawing said armature in the direction of said path component, said stator comprising a plurality of spaced poles extending toward said armature, each of said poles having a pole end face perpendicular to said one path component and oppositely oriented pole side faces parallel to said path component, said armature being an integral one-piece structure and comprising a generally flat body having a plurality of ribs integrally projecting from said body, one said rib between each pair of said spaced stator poles, each of said ribs having oppositely oriented side faces parallel to said path component and to said pole side faces, said body between said ribs having a flat face parallel and opposed to said pole end faces.

2. The solenoid actuator set forth in claim 1 wherein said stator comprises a plurality of annular radially spaced poles having coplanar end faces oriented axially and concentric side faces oriented radially, and wherein said armature comprises a circular generally flat body having a plurality of annular radially spaced ribs integrally projecting therefrom between said stator poles.

3. The solenoid actuator set forth in claim 1 wherein said stator comprises a plurality of spaced parallel linear poles having coplanar end faces and parallel side faces oriented laterally of said poles, and wherein said armature comprises a said generally flat body having a plurality of laterally spaced parallel ribs integrally projecting therefrom between said stator poles.

4. The solenoid actuator set forth in claim 1 wherein said stator comprises first and second pluralities of spaced poles disposed on opposite sides of and extending toward said armature, and wherein said armature comprises a said generally flat body disposed between and parallel to the said end faces of said first and second pluralities of poles, and first and second pluralities of ribs integrally projecting in opposite directions from said body between adjacent pairs of said first and second pluralities of poles.

5. The solenoid actuator set forth in claim 4 wherein said first and second pluralities of poles are offset with respect to each other such that one pole of each such plurality is positioned between a pair of adjacent poles in the opposing said plurality, and wherein said first and second pluralities of ribs are offset with respect to each other in correspondence with the associated said plurality of stator poles.

6. The solenoid actuator set forth in claim 5 wherein the dimension of each said rib in the direction of said offset is less than the dimension between adjacent ribs in both of said pluralities of ribs.

7. The solenoid actuator set forth in claim 1 wherein said armature includes a V-shaped channel formed in each of said ribs at an end thereof remote from said body.

8. A solenoid actuator comprising a generally flat armature, means mounting said armature for movement through a defined stroke path having a path component perpendicular to said armature, and a stator mounted to said path-defining means and oriented with respect to said armature to be electromagnetically coupled to said armature for drawing said armature in the direction of said path component, said stator comprising first and second pluralities of spaced poles disposed on opposite sides of and extending toward said armature, said first and second pluralities of poles being offset with respect to each other such that one pole of each such plurality is positioned between a pair of adjacent poles in the opposing said plurality, each of said poles having a pole end face perpendicular to said one path component and oppositely oriented pole side faces parallel to said path component, said armature comprising a generally flat body disposed between and parallel to said end faces of said first and second pluralities of poles, and first and second pluralities of ribs integrally projecting in opposite directions from said body, one said rib between each pair of said spaced stator poles, said first and second pluralities of ribs being offset with respect to each other in correspondence with the associated said plurality of stator poles, each of said ribs having oppositely oriented side faces parallel to said path component, said body between said ribs having a flat face parallel and opposed to said pole end faces.

* * * * *